(12) United States Patent
Huerta et al.

(10) Patent No.: US 8,874,428 B2
(45) Date of Patent: Oct. 28, 2014

(54) METHOD AND APPARATUS FOR FAST TRANSLATION MEMORY SEARCH

(75) Inventors: Juan M. Huerta, Pleasantville, NY (US); David M. Lubensky, Brookfield, CT (US); Cheng Wu, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 13/412,104

(22) Filed: Mar. 5, 2012

(65) Prior Publication Data
US 2013/0231916 A1 Sep. 5, 2013

(51) Int. Cl.
*G06F 17/28* (2006.01)

(52) U.S. Cl.
CPC .................................. *G06F 17/2827* (2013.01)
USPC .............................................. 704/2; 704/277

(58) Field of Classification Search
CPC .................................................... G06F 17/2827
See application file for complete search history.

(56) References Cited

U.S. PATENT DOCUMENTS

| | | | | |
|---|---|---|---|---|
| 7,054,803 | B2 * | 5/2006 | Eisele .............................. | 704/2 |
| 7,333,927 | B2 * | 2/2008 | Lee et al. ......................... | 704/4 |
| 7,680,646 | B2 * | 3/2010 | Lux-Pogodalla et al. ........ | 704/2 |
| 7,707,025 | B2 * | 4/2010 | Whitelock ........................ | 704/5 |
| 8,296,123 | B2 * | 10/2012 | Thayer et al. .................... | 704/2 |
| 8,401,836 | B1 * | 3/2013 | Kumar et al. ..................... | 704/2 |
| 8,612,205 | B2 * | 12/2013 | Hanneman et al. ............... | 704/4 |
| 2002/0091509 | A1 | 7/2002 | Zoarez et al. | |
| 2004/0044530 | A1 | 3/2004 | Moore | |
| 2007/0010989 | A1 | 1/2007 | Faruquie et al. | |
| 2007/0203691 | A1 | 8/2007 | Okura et al. | |
| 2008/0133218 | A1 * | 6/2008 | Zhou et al. ....................... | 704/5 |
| 2009/0192781 | A1 | 7/2009 | Bangalore et al. | |
| 2010/0004920 | A1 * | 1/2010 | Macherey et al. ................ | 704/4 |
| 2012/0016657 | A1 * | 1/2012 | He et al. ........................... | 704/2 |

OTHER PUBLICATIONS

Watanabe, Hiroshi Maruyama Hideo. "Tree cover search algorithm for example-based translation." Proceedings of the Fourth International Conference on Theoretical and Methodological Issues in Machine Translation (TMI-92). 1992.*

Somers, Harold. "Review article: Example-based machine translation." Machine Translation 14.2 (1999): 113-157.*

Nirenburg, Sergei, Constantine Domashnev, and Dean J. Grannes. "Two approaches to matching in example-based machine translation." Proc. of the 5th International Conference on Theoretical and Methodological Issues in Machine Translation (TMI-93). 1993.*

(Continued)

*Primary Examiner* — Brian Albertalli
(74) *Attorney, Agent, or Firm* — Tutunjian & Bitetto, P.C.; Anne V. Dougherty

(57) ABSTRACT

Methods and systems for fast translation memory search include, in response to an input query string, identifying a plurality of hypothesis strings stored in a translation memory as candidates to match the query string. One or more candidates are eliminated, using a processor, where string lengths between the candidates and the query string are at least a cutoff value representing a string edit distance. One or more candidates are eliminated where differences in word frequency distributions between the candidates and the query string are at least the cutoff value. One or more candidates are eliminated by employing a dynamic programming matrix where string edit distances between the candidates and the query string are at least the cutoff value. A number of remaining candidates are outputted as matches to the query string.

25 Claims, 4 Drawing Sheets

(56) References Cited

OTHER PUBLICATIONS

Semmar, Nasredine, et al. "Using a cross-language information retrieval approach to improve Computer-Aided Translation performance." Intelligent Systems Design and Applications (ISDA), 2010 10th International Conference on. IEEE, 2010.*
Dean, J., et al. "Mapreduce: Simplified Data Processing on Large Clusters" Communications of the ACM (CACM), vol. 51, No. 1. Jan. 2008. pp. 107-113.
Ha, L., et al. "Extension of Zipf's Law to Words and Phrases" Coling 2002, 19th International Conference on Computational Linguistics. Aug. 2002. pp. 1-6.
Huerta, J. "An Information-Retrieval Approach to Language Modeling: Applications to Social Data" WSA '10 Proceedings of the NAACL HLT 2010 Workshop on Computational Linguistics in a World of Social Media. Jun. 2010. (2 Pages).
Huerta, J. "A Stack Decoder Approach to Approximate String Matching" Proceeding of the 33rd International ACM SIGIR Conference on Research and Development in Information Retrieval, SIGIR 2010. Jul. 2010. (2 Pages).
Huerta, J. "Towards Efficient Translation Memory Search Based on Multiple Sentence Signatures" Speech and Language Technologies. Jun. 2011. pp. 3-16.
Landau, G. et al. "Incremental String Comparison" SIAM Journal on Computing archive, vol. 27, Issue 2. Apr. 1998. (29 Pages).
Lin, C. et al. "Automatic Evaluation of Machine Translation Quality Using Longest Common Subsequence and Skip-Bigram Statistics" ACL '04 Proceedings of the 42nd Annual Meeting on Association for Computational Linguistics. Jul. 2004. (8 Pages).
Navarro, G. "A Guided Tour to Approximate String Matching" ACM Computing Surveys, vol. 33., No. 1. Mar. 2001. pp. 31-88.
Navarro, G. et al. "Indexing Methods for Approximate String Matching" Bulletin of the IEEE Computer Society Technical Committee on Data Engineering, vol. 24, No. 1. Mar. 2001. pp. 1-9.
Wang, J., et al. "Trie-Join: Efficient Trie-Based String Similarity Joins With Edit-Distance Constraints" Proceedings of the VLDB Endowment, vol. 3., No. 1. Sep. 2010. (12 Pages).
Williams, H., et al. "Fast Phrase Querying With Combined Indexes" ACM Transactions on Information Systems, vol. 22, No. 4. Oct. 2004. pp. 573-594.

* cited by examiner

100

In response to a query string input, identify a plurality of hypothesis strings stored in a translation memory as candidates to match the query string
102

Define a cutoff value, representing a string edit distance
104

Eliminate hypothesis strings as candidates where the difference in string lengths between each candidate hypothesis string and the query string is a string edit distance of at least the cutoff value
106

Eliminate hypothesis strings as candidates where the difference of word frequency distributions between each candidate hypothesis string and the query string is a string edit distance of at least the cutoff value
108

Eliminate hypothesis strings as candidates where the string edit distance between each candidate hypothesis string and the query string is a string edit distance of at least the cutoff value
110

Output a number of remaining candidates as matches to the query string
112

| i | 0 | 1 | 2 | 3 | 4 | 5 |
|---|---|---|---|---|---|---|
| i |   | A | B | C | A | A |
| 0 |   | 0 | 1 | 2 | 3 | 4 | 5 |
| 1 | D | 1 | 1 | 2 | 3 | 4 | 5 |
| 2 | C | 2 | 2 | 2 | 2 | 4 | 5 |
| 3 | C | 3 | 3 | 3 | 2 | 3 | 4 |
| 4 | A | 4 | 3 | 4 | 3 | 2 | 3 |
| 5 | C | 5 | 4 | 4 | 4 | 3 | 3 |

FIG. 2

METHOD AND APPARATUS FOR FAST TRANSLATION MEMORY SEARCH

BACKGROUND

1. Technical Field

The present invention relates to machine translation and, more specifically, to a method and apparatus for efficient translation memory searches based on multiple sentence signatures.

2. Description of the Related Art

The goal of machine translation is to translate a sentence originally generated in a source language into a sentence in a target language. In the traditional approach to statistical machine translation, tables of phrase pairs are used to generate translation hypotheses under a probabilistic framework. However, this traditional approach to machine translation risks generating sentences with unacceptable linguistic inconsistences and imperfections, such as syntactical, grammatical or pragmatic errors.

Recently, because of the availability of large translation memories, a direct search approach to machine translation has been explored. Translation memories consist of a large database of pre-translated sentence pairs. The underlying assumption in the direct translation memory search approach is that, if an input sentence (referred to as a query) is sufficiently similar to a previously hand translated sentence stored in memory, it is generally preferable to use such existing translation over the generated statistical machine translation hypothesis. However, for this approach to be practical, it should be possible to efficiently search large translation memories.

SUMMARY

A method for fast translation memory search includes, in response to an input query string, identifying a plurality of hypothesis strings stored in a translation memory as candidates to match the query string. One or more candidates are eliminated, using a processor, where string lengths between the candidates and the query string are at least a cutoff value representing a string edit distance. One or more candidates are eliminated where differences in word frequency distributions between the candidates and the query string are at least the cutoff value. One or more candidates are eliminated by employing a dynamic programming matrix where string edit distances between the candidates and the query string are at least the cutoff value. A number of remaining candidates are outputted as matches to the query string.

A method for fast translation memory search includes, in response to an input query string, identifying a plurality of hypothesis strings stored in a translation memory as candidates to match the query string. The translation memory is partitioned into a plurality of partitions and the candidates in the partition are assigned corresponding worker nodes. Each worker node performs the following steps: one or more candidates are eliminated, using a processor, where string lengths between the candidates and the query string are at least a cutoff value representing a string edit distance; one or more candidates are eliminated where differences in word frequency distributions between the candidates and the query string are at least the cutoff value; and one or more candidates are eliminated by employing a dynamic programming matrix where string edit distances between the candidates and the query string are at least the cutoff value. A number of remaining candidates is reduced by determining a top n candidates with a lowest string edit distance as matches to the query string, wherein n is any positive integer. The top n candidates are outputted as matches to the query string.

A computer readable storage medium includes a computer readable program, wherein the computer readable program when executed on a computer causes the computer to perform the following steps. In response to an input query string, a plurality of hypothesis strings stored in a translation memory is identified as candidates to match the query string. One or more candidates are eliminated, using a processor, where string lengths between the candidates and the query string are at least a cutoff value representing a string edit distance. One or more candidates are eliminated where differences in word frequency distributions between the candidates and the query string are at least the cutoff value. One or more candidates are eliminated by employing a dynamic programming matrix where string edit distances between the candidates and the query string are at least the cutoff value. A number of remaining candidates are outputted as matches to the query string.

A system for fast translation memory search includes a candidate module configured to identify a plurality of hypothesis strings stored in a translation memory as candidates to match a query string in response to the input query string. A string length signature module is configured to eliminate one or more candidates, using a processor, where string lengths between the candidates and the query string are at least a cutoff value representing a string edit distance. A lexical distribution signature module is configured to eliminate one or more candidates where differences in word frequency distributions between the candidates and the query string are at least the cutoff value. A dynamic programming module is configured to eliminate one or more candidates by employing a dynamic programming matrix where string edit distances between the candidates and the query string are at least the cutoff value. A number of remaining candidates is outputted as matches to the query string.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 is a block/flow diagram illustratively depicting a system/method for fast translation memory search, in accordance with one embodiment;

FIG. 2 shows an exemplary dynamic programming matrix, in accordance with one embodiment;

DETAILED DESCRIPTION OF PREFERRED EMBODIMENTS

Figure 3:
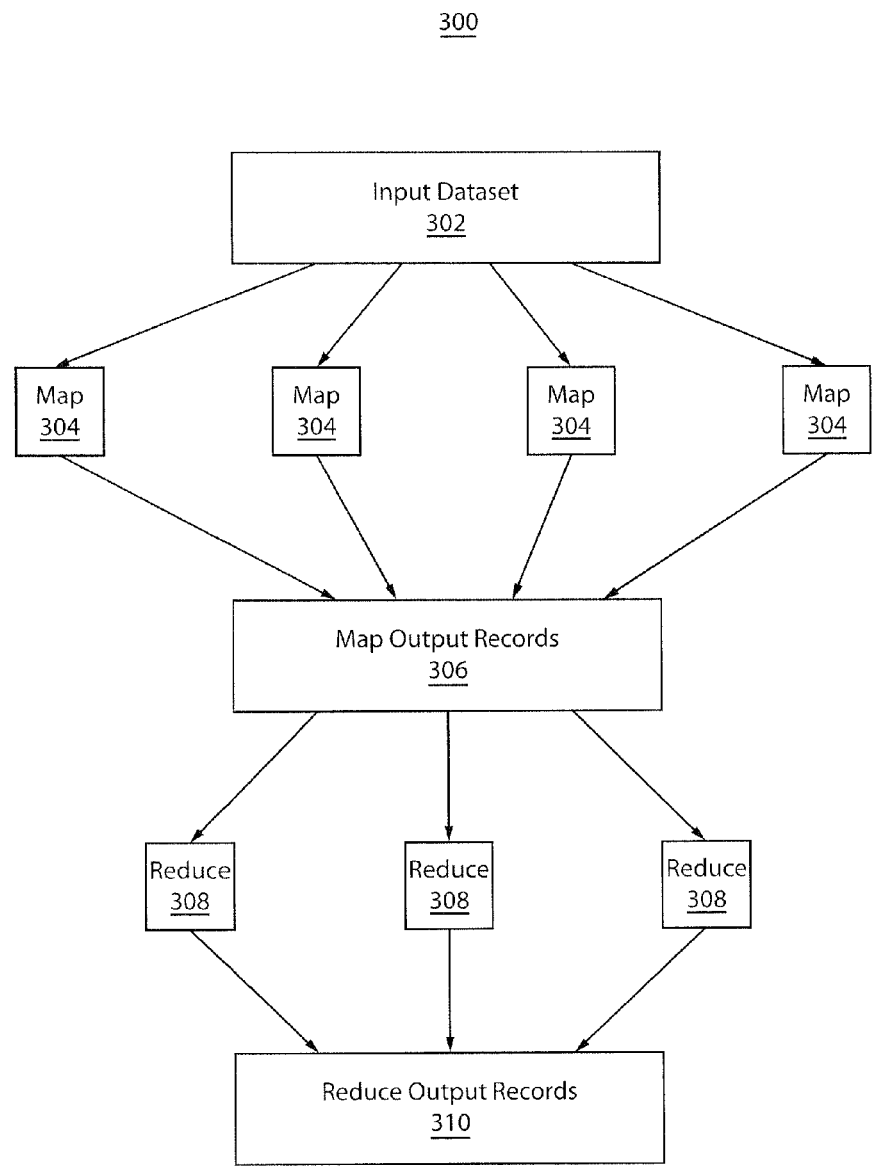
FIG. 3 is a block/flow diagram illustratively depicting a system/method of MapReduce for the fast translation memory search, in accordance with one embodiment.

In accordance with the present principles, methods and apparatuses are provided for fast translation memory search based on the string edit distance. The string edit distance is an expensive operation to compute. The present principles provide a multi-signature approach, whereby the signatures are very fast at computing out of bounds conditions, but slower at carrying out exact string edit distance score computations.

The present principles allow for a great increase in efficiency by removing unpromising hypothesis sentences from the candidate pool at each signature. The multi-signature approach rapidly eliminates unpromising hypothesis strings as search candidates using increasingly stringent out of bound conditions before computing the exact string edit distance score between the remaining candidate hypothesis strings and the query string. In a preferred embodiment, each signature is computationally faster than any subsequent signature. Accuracy is also inversely proportional to speed. In this manner, unpromising hypothesis strings are rapidly eliminated as search candidates at a computationally faster, but less accurate signature before proceeding to a computationally slower, but more accurate signature.

Translation memory search utilizes the computation of the string edit distance between an input string (also referred to as a query string or query sentence) and a large collection of sentences (referred to as a hypothesis string set or hypothesis sentence set), which make up the translation memory. The string edit distance between two strings is defined as the number of operations that need to be applied on one string to transform the one string into a second string. Operations may include, for example, but are not limited to, insertions, deletions and substitutions.

One concept of the present principles is to define a radius k in which to focus the search at each signature, where k represents a string edit distance. In other words, a cutoff value k is used to rapidly eliminate unpromising hypothesis strings as search candidates at each signature using increasingly stringent elimination criteria. At a first signature phase, hypothesis strings are eliminated that do not have string lengths within k edits of the query string length. At a second signature phase, the remaining hypothesis strings are lexically compared with the query string, such that the word frequency of the hypothesis strings and query string are each placed in a vector and sorted by increasing frequency. The vectors are compared and hypothesis strings with k or more differences from the query string are eliminated. At a third signature phase, the string edit distance of the remaining hypothesis strings are compared with the query string using a bounded dynamic programming matrix. In one embodiment, the MapReduce framework can be applied to carry out the multi-signature approach in a parallelized fashion.

Advantageously, the present principles decompose the conventional single kernel computation of a translation memory into multiple signatures to thereby provide accurate results at speeds comparable to those produced by less accurate approaches. In one preferred embodiment, each signature is much faster than any of its subsequent signatures to thereby rapidly eliminate unpromising hypothesis strings as search candidates at computationally faster, but less accurate signatures before proceeding to a computationally slower, but more accurate signature.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a block/flow diagram illustratively depicting a method for fast translation memory search 100 is shown in accordance with one embodiment. The method 100 is intended to produce the best possible result at speeds comparable to those produced by less accurate approaches, in a way that is efficiently parallelizable. To achieve this, the fast translation memory search method 100 decomposes the conventional single dynamic programming computation into multiple consecutive string signature-based computations. The multi-signature approach allows for a great increase in the efficiency of the search by removing unpromising hypothesis sentences from the candidate pool at each signature. In a preferred embodiment, each signature is computationally faster than any subsequent signature. Speed and accuracy are inversely proportional so that trade-offs may be found. In this manner, the method 100 may be able to rapidly eliminate a large number of hypothesis strings as search candidates at a computationally faster, but less accurate signature before proceeding with computationally slower, but more accurate signatures.

The fast translation search method 100 utilizes the multi-signature efficient computation of the string edit distance between a query string and large hypothesis string set in a target language. The string edit distance between two strings is defined as the number of operations that need to be applied on the query string to transform the query string into the hypothesis string. Operations may include, for example, but are not limited to, insertions, deletions and substitutions.

It is noted that the present principles are not limited to the field of machine translation. Rather, the present principles may be applicable to any field involving the comparison of strings. For example, the present principles may be applied to implement a spelling correction program. And even further, the present principles may be extended to other non-textual domains in which, for example, the problems consists of finding the most similar sequence, such as DNA sequences. Other applications are also contemplated.

At each signature stage, the fast translation search method 100 should be able to decide efficiently with certainty if a string lies outside the hypersphere. By starting each stage with a very large number of candidates and eliminating a subset, the fast translation search method 100 shows the equivalent of perfect recall, but its precision only increases inversely proportionally to the running speed. Each signature is run by a kernel, which are designed to be very fast at detecting out of bound strings and slower at carrying out exact score computations. Additionally, speed and accuracy are inversely proportional so trade-offs can be found.

In block 102 of FIG. 1, in response to a query string input, a plurality of hypothesis strings stored in a translation memory are identified as candidates to match the query string. In block 104, a cutoff value is defined. The cutoff value represents a hypersphere of a radius equal to k in which to carry out the multi-signature search, where k represents the string edit distance between the query string and a hypothesis string. In other words, a cutoff value k is used to eliminate hypothesis strings as candidates. The hypersphere can be empty (i.e., without any hypothesis strings) if there is no single match within the cutoff value (i.e., whose distance is smaller than the cutoff value). In an embodiment, k is a parameter defined at the query level and its value is unique across all hypothesis strings. However, as described below, k can be adjusted according to hypothesis-type to further expedite the computation.

In block 106, a string length signature computation compares the string lengths of the query string with the hypothesis strings to eliminate unpromising hypothesis strings as search candidates. The string length signature step is designed to rapidly eliminate a large percentage of the possible hypothesis strings as search candidates. Hypothesis strings are eliminated as search candidates where the difference in string lengths between each candidate hypothesis string and the query string is a string edit distance of at least the cutoff value k. In one embodiment, the string length signature may include multiple cutoff values of k. The multiple values of k may depend on the length of the hypothesis string. For example, one can run with a standard k for hypothesis strings larger than 10 and a smaller k for hypothesis strings smaller or equal to 10. This results in an even faster elimination of candidate hypothesis strings.

In block 108 of FIG. 1, a lexical distribution signature computation compares the distribution of words of the query string with each hypothesis string to further eliminate unpromising hypothesis strings as search candidates. A Zipf-like distribution of the occurrence frequency of words in the translation memory and the query string is leveraged to speed up this comparison. The lexical distribution signature compares a vector for the query string with a vector for each of the hypothesis strings in the translation memory. The vectors consist of all of the words in the particular query string or hypothesis string sorted by increasing frequency. Hypothesis strings are eliminated as search candidates where the difference of word frequency distributions between each candidate hypothesis string and the query string is a string edit distance of at least the cutoff value k. That is, the comparison stops as soon as k differences are observed, where k represents the string edit distance between the query string and a hypothesis string, and that particular hypothesis string is eliminated as a candidate.

A sample pseudocode for the lexical distribution signature computation is provided as follows:

```
construct the sorted vector for strings Sa and Sb
i=0, j=0;
while number of differences is less than k (d<k)
    if Sa[i]==Sb[j]
        then
        i++; j++; break;
    else if Sa[i]>Sb[j]
        d++; j++;
    else
        d++; i++;
end while
```

After string length signature 106 and lexical distribution signature 108 have been carried out, a significant number of candidate hypotheses have been eliminated. In block 110 of FIG. 1, a bounded dynamic programming signature is performed over the surviving hypotheses to compare the string edit distance between each hypothesis string with the query string to eliminate unpromising hypothesis strings as search candidates. Hypothesis strings are eliminated as candidates where the string edit distance between each candidate hypothesis string and the query string is a string edit distance of at least the cutoff value k. The dynamic programming signature computes a matrix D between two strings, S1 and S2, where $S1=\{a_1, \ldots, a_n\}$ and $S2=\{b_1, \ldots, b_m\}$ and where n and m are the number of words in strings S1 and S2, respectively. The matrix D, referred to as the edit-distance-matrix, is of dimensions (m+1)×(n+1). The entry D[ij] is the string edit distance, SED(S1i,S2j), between the prefixes $S1_i$ and $S2_j$. The fundamental dynamic programming recurrence is in equation 1, where $\partial$ is a variable with a value equal to 0 if the i-th word in S1 is equal to the j-th word in S2, and equal to 1 otherwise.

$$D[i, j] = \min \begin{cases} D[i-1, j] + 1 & \text{if } i > 0 \\ D[i, j-1] + 1 & \text{if } j > 0 \\ D[i-1, j-1] + \partial_{a,b} & \text{if } i > 0 \text{ and } j > 0 \end{cases} \quad (1)$$

The dynamic programming recursion is computed taking into consideration the words of the query and the hypothesis sentence. In equation 1, D[i,j] denotes the distance between the sentence S1 and sentence S2 (or more precisely between the prefixes of length i and j of these sentences).

FIG. 2 illustratively depicts a sample dynamic programming matrix 200, where string 202 is "A B C A A" and string 204 is "D C C A C." For simplicity, each letter represents a word in strings 202 and 204. The initial condition 206 is D[0, 0]=0. The string edit distance 208 can be found in the lower right cell in the matrix, D[m,n]. It can be seen that the string edit distance between strings 202 and 204 is 3.

In one particularly useful embodiment, the dynamic programming signature implements two rules to increase efficiency: 1) the dynamic programming signature stops when the minimum distance in an alignment is k (i.e., when the smallest value in the last column is k), and 2) the query string and hypothesis string may be interchanged so that the longer string is represented in the column and the shorter string is represented in the row. The comparison of word i vs. word j helps to determine the values of $\partial$ (in Equation 1), however the expense of the computation does not reside in the computation of the $\partial$ but in the computation of the recursion matrix D. The computation of recursion matrix D and the computation of subsequent $\partial$'s is obviated if the recursion is stopped after all the values in a column are larger than k. Subsequent values of D will necessarily be larger than these values. Thus the recursion can be aborted and the computation saved.

In block 112 of FIG. 1, a number of remaining candidates are outputted as matches to the query string. In one embodiment, the number of remaining candidates includes the top n candidates with the lowest string edit distance score, where n is any positive integer.

In one embodiment, to further increase speed, each sentence in the translation memory and the query itself are represented by non-negative integers (instead of strings or words), where each integer represents a word ID based on a dictionary. The comparisons are thus carried out in terms of integer comparisons. Special named entities not found in the dictionary may be mapped to an unknown word ID.

In one particularly useful embodiment, the translation memory is built during off-line development prior to the implementation of the multi-signature approach of the fast translation search method 100. The translation memory consists of a record for each sentence in the memory. Each record in the memory will consist of multiple fields. In a preferred embodiment, the record consists of the following fields: 1) sentence length; 2) lexical signature vector for the sentence; 3) dictionary filtered memory sentence; and 4) plain text sentence. Other fields are also contemplated. While this representation of the translation memory will increase the size of the translation memory, it has been found to increase the efficiency of fast translation search method 100. It is noted that alternative approaches have also been contemplated. For example, in another embodiment, the signature information of the translation memory can be computed for each query as it is received.

The multi-signature approach of the fast translation search method 100 can be further sped up by carrying it out in a parallelized fashion. In one embodiment, this is implemented using the MapReduce framework. Other methods are also contemplated. MapReduce is a framework for processing highly distributable problems across huge datasets using a large number of computer nodes. The basic idea is to segment the large dataset (i.e., the translation memory including hypothesis strings) and provide portions of the dataset to each of the worker nodes to evaluate by applying the multi-signature approach in parallel. The remaining hypothesis strings are reduced to determine the top N results, where N is any positive integer.

Referring now to FIG. 3, a block/flow diagram illustratively depicting a system/method of MapReduce 300 for the fast translation memory search is shown in accordance with one embodiment. In block 302, an input dataset is provided and partitioned into smaller sub-sets. The input dataset includes the query string and the translation memory including hypothesis strings. In blocks 304, the partitioned subsets are distributed to worker nodes. Each map job 304 reads the file including the hypothesis strings and associates each hypothesis string with a key. Using the multi-signature approach for fast translation memory search, each worker node rapidly evaluates the string edit distance feasibility of the hypothesis strings for its partitioned subset and eliminates the hypothesis strings as search candidates that fall outside a certain cutoff value k. In an embodiment, each worker node performs at least one of steps 106, 108 and 110. In a preferred embodiment, the worker nodes are run in parallel. In block 306, for those hypothesis strings whose score lies within the cutoff value k, it creates an entry in the hash map consisting of key-value pairs. The entry has, as the key, the query string ID and, as the value, a structure with the string edit distance score and memory ID.

In block 308, each node reduces the hypothesis strings assigned to the node to determine the hypothesis strings whose key correspond to the query string. In this way, only the hypothesis strings within the radius k are passed from the map step to the reduce steps. Hence, only the hypothesis string or strings with the best (i.e., lower) string edit distances are passed over to the subsequent Reduce step. By reducing the number of hypothesis strings passed over to the Reduce step, runtime is significantly increased. From these sets, the final hypotheses list is created. In block 310, the hypothesis strings whose key corresponds to the query string are collated and the best candidate or top N-best candidates are selected, where N is any positive integer. It is possible that this set is empty for a particular query string if no hypotheses existed in the memory within k edits. Combined with MapReduce, the fast translation memory search method 100 produces very efficient implementations.

Figure 4:
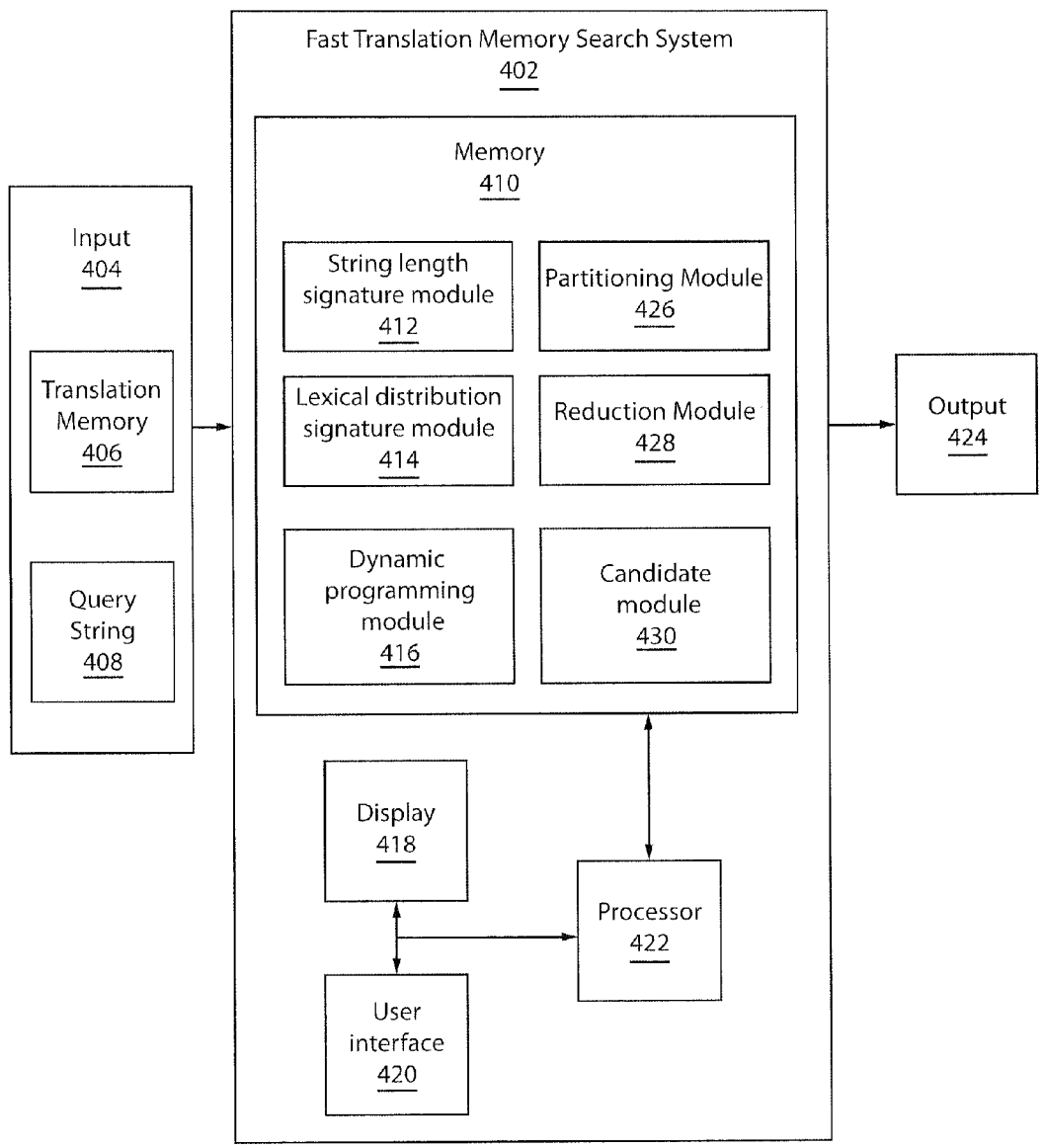
FIG. 4 is a block/flow diagram illustratively depicting a system/method for fast translation memory search, in accordance with one embodiment.

Referring now to FIG. 4, a block/flow diagram illustratively depicting a system for fast translation memory search 400 is shown in accordance with one embodiment. System 402 for fast translation memory search may include a workstation or console. System 402 preferably includes memory 410 and processor 422 for storing programs and applications. System 402 may include one or more displays 418 for viewing, which may also permit a user to interact with system 402 and its components and functions. This is further facilitated by user interface 420, which may include a keyboard, mouse, joystick, or any other peripheral or control to permit user interaction with system 402. It should be understood that the functions and components of system 402 may be integrated into one or more workstations or systems.

System 402 may receive input 404, which may include translation memory 406 and query string 408, which may be stored in memory 410. Input 404 may employ use of display 418 and user interface 420. Translation memory 406 includes one or more hypothesis strings. Memory 410 of fast translation memory search system 402 stores string length signature module 412, lexical distribution signature module 414, dynamic programming module 416, partitioning module 426, reduction module 428 and candidate module 430. Fast translation memory search system 402 is intended to produce the best possible result at speeds comparable to those produced by less accurate approaches, in a way that is efficiently parallelizable. To achieve this, the multi-signature approach of the present principles is applied. In a preferred embodiment, each signature is computationally faster than any subsequent signature, thereby rapidly eliminating a very large number of hypothesis strings as search candidates in a faster, but less accurate signature before proceeding to a computationally slower, but more accurate signature. A hypersphere of radius equal to k is defined in which to carry out the multi-signature search, where k represents the string edit distance. The hypersphere of radius k is used as a cutoff value to eliminate hypothesis strings as candidates at each signature by applying the multi-signature approach of the fast translation memory search system 402.

In candidate module 430, in response to the query string input, a plurality of hypothesis strings stored in a translation memory are identified as candidates to match the query string. String length signature module 412 compares the length of the query string with hypothesis strings to eliminate those hypothesis strings that are not within k string edit distances from the query string. String length signature module 412 is designed to rapidly eliminate a large percentage of the possible hypothesis strings in the translation memory as candidates. In one embodiment, multiple values of k may be used to result in an even faster elimination of candidate hypothesis strings. For example, multiple values of k may be used depending on the length of the hypothesis string.

Lexical distribution signature module 414 compares a vector for the query string with a vector for each of the hypothesis strings in the translation memory. The vectors consist of all of the words in the query string or hypothesis string, respectively, sorted by increasing frequency. Lexical distribution signature module 414 eliminates those hypothesis strings as candidates that have at least k differences from the query string. A Zipf-like distribution of the occurrence frequency of words in the translation memory and the query string is leveraged to speed up this comparison.

Dynamic programming module 416 computes a dynamic programming matrix over the surviving hypotheses. The dynamic programming matrix compares the string edit distance between words in the query string and a hypothesis string. To further increase efficiency, the dynamic programming module 416 stops after the minimum distance in an alignment is k. Additionally, the query string and the hypothesis string in the dynamic programming matrix may be interchanged, so that the longer string is the column and the shorter string is the row. In one embodiment, to further increase speed, each sentence in the translation memory and the query itself are represented by non-negative integers, where each integer represents a word ID based on a dictionary. Special elements not found in a dictionary may be mapped to the unknown word ID.

In a preferred embodiment, a translation memory is built off-line prior to implementing fast translation search system 402. The translation memory consists of multiple fields. For example, in a preferred embodiment, the record may consist of the following fields: 1) sentence length; 2) lexical signature vector for the sentence; 3) dictionary filtered memory sentence; and 4) plain text sentence. While this representation of the translation memory will increase the size of the memory, it has been found to increase the efficiency of fast translation search system 402. Other approaches have also been contemplated.

Fast translation search system 402 can be further sped up by applying a parallel framework in which to run each signature. In particularly useful embodiment, the MapReduce framework can be implemented. Other approaches are also contemplated. The MapReduce framework partitions the dataset (i.e., translation memory), which is distributed to worker nodes, in partitioning module 426. The worker nodes apply the multi-signature approach of the present principles for the hypothesis strings in its assigned partition. In one embodiment, each worker nodes applies at least one of the string length signature module 412, lexical distribution signature module 414 and dynamic programming module 416. In a preferred embodiment, the worker nodes perform tasks in parallel with respect to other worker nodes. For those hypothesis strings that fall within the hypersphere, an entry is created in the hash map consisting of key-value pairs. The entry consists of the query sentence ID as the key and a structure with the string edit distance and memory ID as the value. The results in the hash map are reduced in reduction module 428 such that, for the remaining hypothesis strings, entries whose key corresponds to the query string are collated and the best hypothesis string or the top N-best candidate hypothesis strings are selected. The increase in speed is proportional to the ratio of the volume enclosed in the hypersphere divided by the whole volume of the original hypotheses space. As such, the ratio of the number of surviving hypotheses to the number of original hypotheses is closely related to the effective reduction in computation.

Fast translation memory search system finds a number of remaining candidate hypothesis strings as matches to the query string as output 424. In one embodiment, the number of remaining candidate hypothesis strings is the top N candidates, where N is any positive integer. Output 424 may include use of display 418 and user interface 420.

Having described preferred embodiments of a method and apparatus for fast translation memory search (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for fast translation memory search, comprising:
   in response to an input query string, identifying a plurality of hypothesis strings stored in a translation memory as candidates to match the query string;
   eliminating one or more candidates, using a processor, where string lengths between the candidates and the query string are at least a cutoff value representing a string edit distance;
   eliminating one or more candidates where differences in word frequency Distributions between the candidates and the query string are at least the cutoff value;
   eliminating one or more candidates by employing a dynamic programming matrix where string edit distances between the candidates and the query string are at least the cutoff value; and
   outputting a number of remaining candidates as matches to the query string.

2. The method as recited in claim 1, further comprising:
   partitioning the translation memory into a plurality of partitions and assigning the candidates in the partition corresponding worker nodes, wherein each worker node performs at least one of the eliminating steps.

3. The method as recited in claim 2, wherein the worker nodes are run in parallel.

4. The method as recited in claim 1, further comprising:
   reducing the number of remaining candidates as matches to the query string by determining a top n remaining candidates with a lowest string edit distance as matches to the query string, wherein n is any positive integer.

5. The method as recited in claim 1, wherein eliminating one or more candidates where string lengths between the candidates and the query string are at least the cutoff value includes:
   for string lengths of at least a first length, eliminating one or more candidates Where string lengths are at least a first cutoff value; and
   for string lengths less than the first length, eliminating one or more candidates Where string lengths are at least a second cutoff value.

6. The method as recited in claim 1, wherein eliminating one or more candidates where differences in word frequency distributions between the candidates and the query string are at least the cutoff value includes representing each of the candidates and the query string as separate vectors.

7. The method as recited in claim 6, wherein the vectors include words sorted by increasing frequency.

8. The method as recited in claim 1, wherein eliminating one or more candidates by employing a dynamic programming matrix includes eliminating candidates where a minimum string edit distance in an alignment of the dynamic programming matrix is at least the cutoff value.

9. The method as recited in claim 1, wherein eliminating one or more candidates by employing a dynamic programming matrix includes setting a longer of the candidate and the query string as a column and a shorter of the candidate and the query string as a row.

10. The method as recited in claim 1, wherein the translation memory includes a record for each candidate, the record comprising at least one of the following fields: string length, word frequency distribution vector, dictionary filtered memory string, and plain text string.

11. A method for fast translation memory search, comprising:
    in response to an input query string, identifying a plurality of hypothesis strings stored in a translation memory as candidates to match the query string;
    partitioning the translation memory into a plurality of partitions and assigning the candidates in the partition corresponding worker nodes, each worker node performing the steps of:
       eliminating one or more candidates, using a processor, where string Lengths between the candidates and the query string are at least a cutoff value representing a string edit distance,
       eliminating one or more candidates where differences in word frequency distributions between the candidates and the query string are at least the cutoff value, and
       eliminating one or more candidates by employing a dynamic programming matrix where string edit distances between the candidates and the query string are at least the cutoff value;
    reducing a number of remaining candidates by determining a top n candidates with a lowest string edit distance as matches to the query string, wherein n is any positive integer; and
    outputting the top n candidates as matches to the query string.

12. The method as recited in claim 11, wherein eliminating one or more candidates where differences in word frequency distributions between the candidates and the query string are at least the cutoff value includes representing each of the candidates and the query string as separate vectors, wherein the vectors include words sorted by increasing frequency.

13. The method as recited in claim 11, wherein eliminating one or more candidates by employing a dynamic programming matrix includes eliminating candidates where a minimum string edit distance in an alignment of the dynamic programming matrix is at least the cutoff value.

14. The method as recited in claim 11, wherein eliminating one or more candidates by employing a dynamic programming matrix includes setting a longer of the candidate and the query string as a column and a shorter of the candidate and the query string as a row.

15. A computer readable storage medium comprising a computer readable program, wherein the computer readable program when executed on a computer causes the computer to perform the steps of:
    in response to an input query string, identifying a plurality of hypothesis strings stored in a translation memory as candidates to match the query string;

eliminating one or more candidates, using a processor, where string lengths between the candidates and the query string are at least a cutoff value representing a string edit distance;

eliminating one or more candidates where differences in word frequency distributions between the candidates and the query string are at least the cutoff value;

eliminating one or more candidates by employing a dynamic programming matrix where string edit distances between the candidates and the query string are at least the cutoff value; and outputting a number of remaining candidates as matches to the query string.

16. A system for fast translation memory search, comprising:

a candidate module configured to identify a plurality of hypothesis strings stored in a translation memory as candidates to match a query string in response to the input query string;

a string length signature module configured to eliminate one or more candidates, using a processor, where string lengths between the candidates and the query string are at least a cutoff value representing a string edit distance;

a lexical distribution signature module configured to eliminate one or more candidates where differences in word frequency distributions between the candidates and the query string are at least the cutoff value;

a dynamic programming module configured to eliminate one or more candidates by employing a dynamic programming matrix where string edit distances between the candidates and the query string are at least the cutoff value; and an output including a number of remaining candidates as matches to the query string.

17. The system as recited in claim 16, further comprising:

a partitioning module configured to partition the translation memory into a plurality of partitions and assign the candidates in the partition corresponding worker nodes, wherein each worker node applies at least one of the string length signature module, the lexical distribution signature module and the dynamic programming module.

18. The system as recited in claim 17, wherein the worker nodes are run in parallel.

19. The system as recited in claim 16, further comprising:

a reduction module configured to reduce the number of remaining candidates as matches to the query string by determining a top n remaining candidates with a lowest string edit distance as matches to the query string, wherein n is any positive integer.

20. The system as recited in claim 16, wherein the string length signature module is further configured to:

for string lengths of at least a first length, eliminate one or more candidates where string lengths are at least a first cutoff value; and for string lengths less than the first length, eliminating one or more candidates where string lengths are at least a second cutoff value.

21. The system as recited in claim 16, wherein the lexical distribution signature module is further configured to represent each of the candidates and the query string as separate vectors.

22. The system as recited in claim 21, wherein the vectors include words sorted by increasing frequency.

23. The system as recited in claim 16, wherein the dynamic programming module is further configured to eliminate candidates where a minimum string edit distance in an alignment of the dynamic programming matrix is at least the cutoff value.

24. The system as recited in claim 16, wherein the dynamic programming module is further configured to set a longer of the candidate and the query string as a column and a shorter of the candidate and the query string as a row.

25. The system as recited in claim 16, wherein the translation memory includes a record for each candidate, the record comprising at least one of the following fields: string length, word frequency distribution vector, dictionary filtered memory string, and plain text string.

* * * * *